United States Patent
Borazjani

(10) Patent No.: US 12,296,944 B2
(45) Date of Patent: May 13, 2025

(54) SYSTEMS AND METHODS FOR PRODUCING TRAVELING WAVES ALONG SURFACES EXPOSED TO SUPERSONIC FLUID FLOWS

(71) Applicant: The Texas A&M University System, College Station, TX (US)

(72) Inventor: Iman Borazjani, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 18/136,526

(22) Filed: Apr. 19, 2023

(65) Prior Publication Data
US 2024/0043112 A1  Feb. 8, 2024

Related U.S. Application Data

(60) Provisional application No. 63/332,598, filed on Apr. 19, 2022.

(51) Int. Cl.
| | |
|---|---|
| *B64C 23/04* | (2006.01) |
| *B64C 21/01* | (2023.01) |
| *F02C 7/04* | (2006.01) |
| *F02K 7/14* | (2006.01) |
| *B64C 30/00* | (2006.01) |

(52) U.S. Cl.
CPC .............. *B64C 23/04* (2013.01); *B64C 21/01* (2023.01); *F02C 7/04* (2013.01); *F02K 7/14* (2013.01); *B64C 30/00* (2013.01)

(58) Field of Classification Search
CPC ......... B64C 21/10; B64C 23/00; B64C 23/04; B64C 23/005
See application file for complete search history.

(56) References Cited

U.S. PATENT DOCUMENTS

| | | | | |
|---|---|---|---|---|
| 5,595,205 | A * | 1/1997 | Sirovich | B64C 21/10 |
| | | | | 137/833 |
| 6,215,221 | B1 * | 4/2001 | Cabuz | B64C 13/48 |
| | | | | 310/309 |
| 8,074,939 | B2 * | 12/2011 | Hyde | B64C 21/10 |
| | | | | 244/99.8 |
| 8,235,329 | B1 * | 8/2012 | Darling | B64C 23/005 |
| | | | | 244/203 |
| 9,315,259 | B1 * | 4/2016 | McKeon | B64C 21/10 |
| 11,744,157 | B2 * | 8/2023 | Wine | H10N 30/802 |
| | | | | 310/311 |

(Continued)

FOREIGN PATENT DOCUMENTS

WO  WO-2020257670 A1 * 12/2020 ............. B64C 13/50

*Primary Examiner* — Michael H Wang
(74) *Attorney, Agent, or Firm* — Conley Rose, P.C.

(57) ABSTRACT

A supersonic flow system in which a supersonic flow is encountered includes a surface configured to be exposed to a supersonic fluid flow, wherein the surface includes an upstream end and a downstream end opposite the upstream end, a wave generator coupled to the surface and including one or more actuators configured to selectably induce strain in the surface, and a wave controller in signal communication with the wave generator and configured to activate the one or more actuators to induce one or more travelling waves configured to travel along the surface between the upstream end and the downstream end of the surface.

18 Claims, 6 Drawing Sheets

(56) References Cited

U.S. PATENT DOCUMENTS

| | | | |
|---|---|---|---|
| 2008/0128560 A1* | 6/2008 | Hyde | B64C 23/005 244/203 |
| 2016/0114883 A1* | 4/2016 | Guerry | B08B 17/065 428/141 |
| 2019/0291884 A1* | 9/2019 | Mackin | B64C 30/00 |
| 2022/0258853 A1* | 8/2022 | Linde | B64C 3/20 |
| 2022/0324555 A1* | 10/2022 | Borazjiani | B64C 3/38 |

* cited by examiner

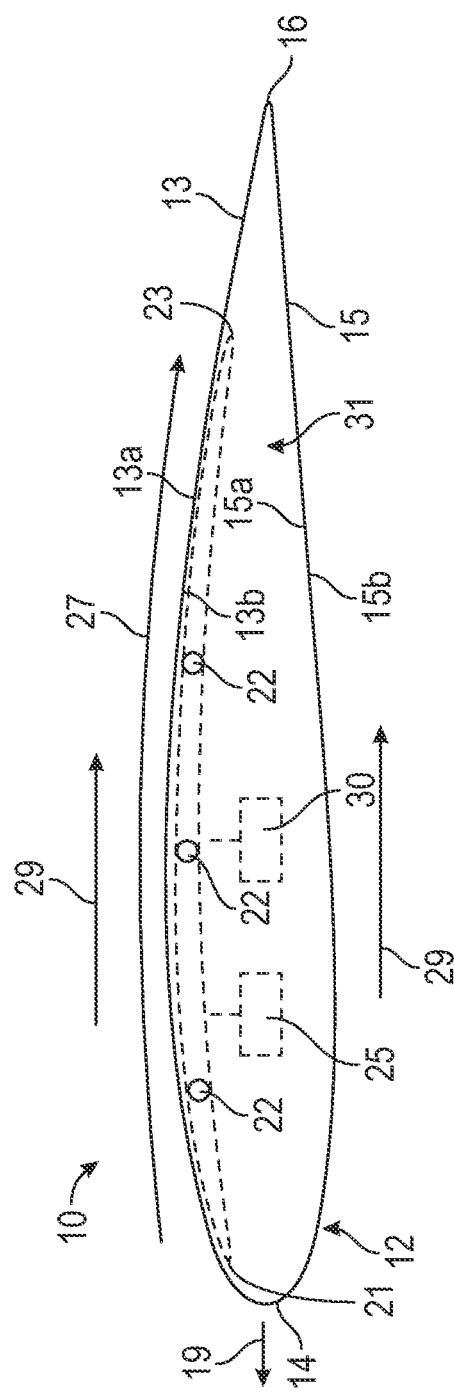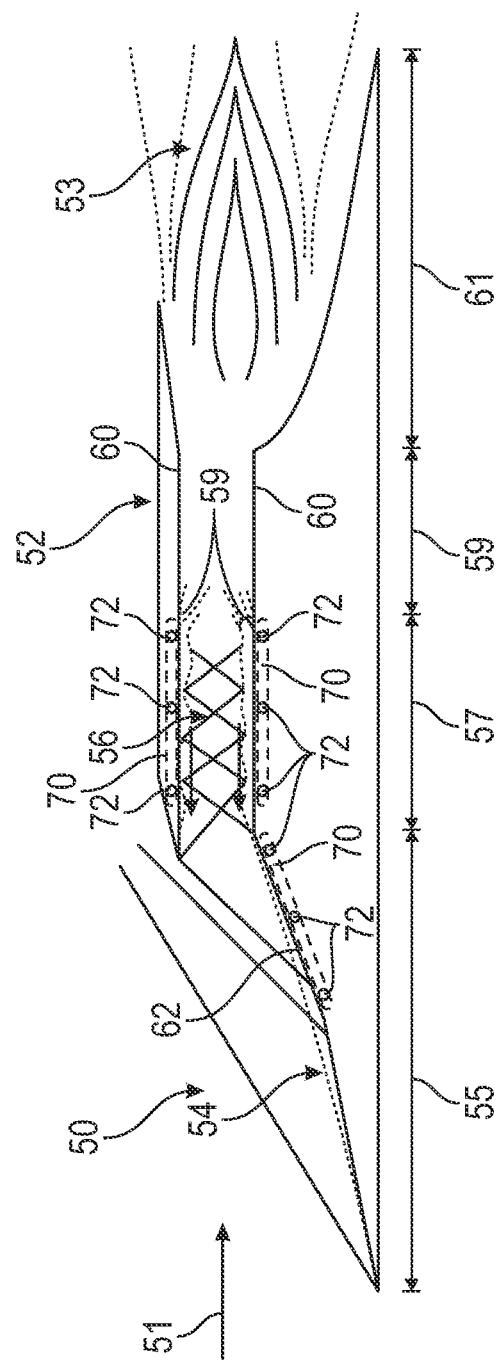
FIG. 1
FIG. 2

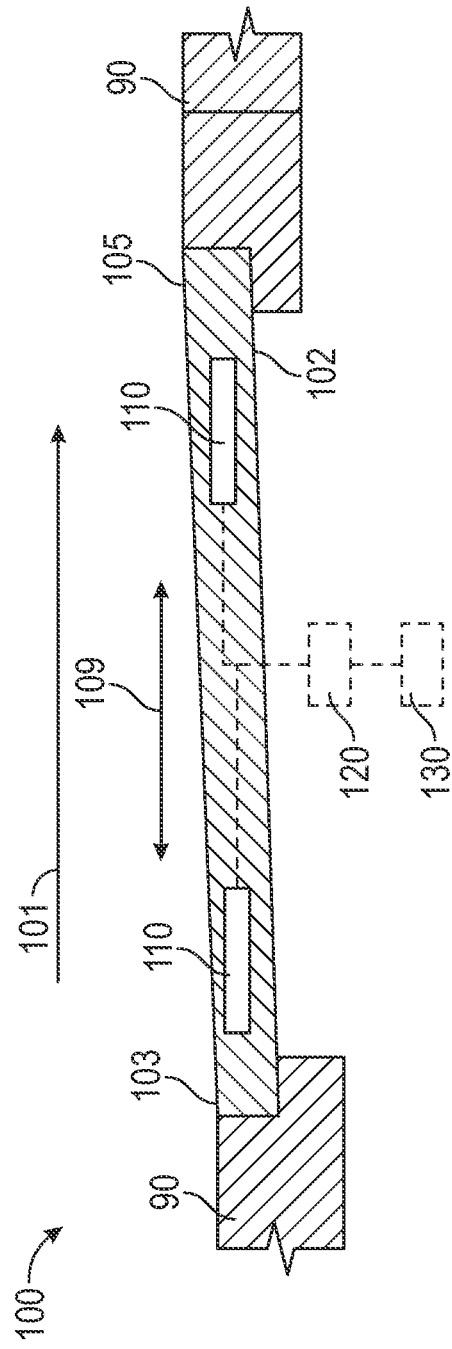
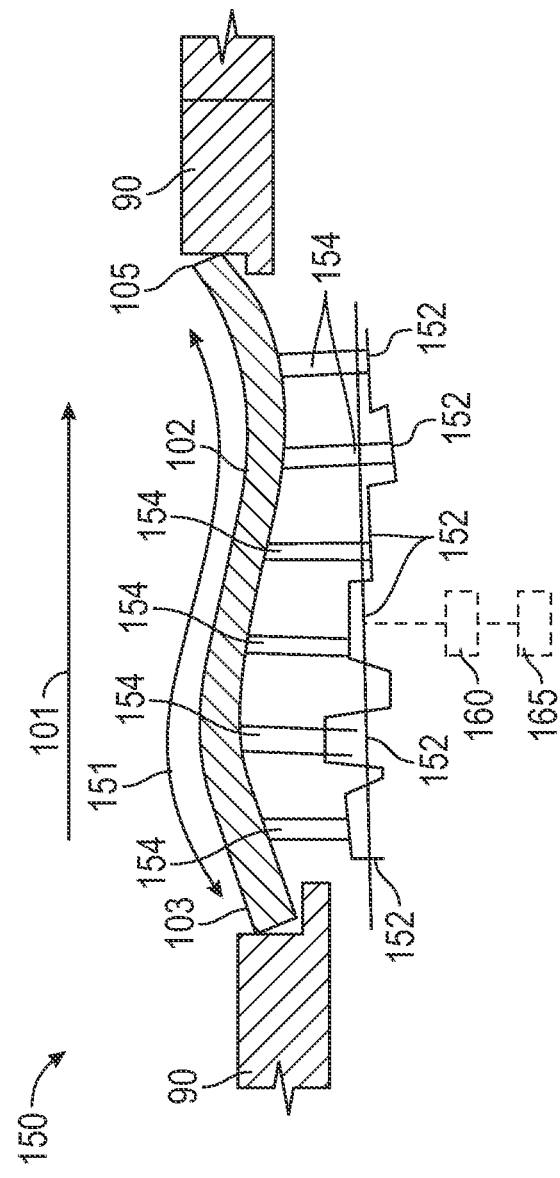

SYSTEMS AND METHODS FOR PRODUCING TRAVELING WAVES ALONG SURFACES EXPOSED TO SUPERSONIC FLUID FLOWS

CROSS-REFERENCE TO RELATED APPLICATIONS

This application claims benefit of U.S. provisional patent application Ser. No. 63/332,598 filed Apr. 19, 2022 and entitled "Traveling Waves for Reducing/Removing Shocks from Flow", "which is hereby incorporated herein by reference in its entirety for all purposes.

STATEMENT REGARDING FEDERALLY SPONSORED RESEARCH OR DEVELOPMENT

This invention was made with government support under Contract No. CBET-1829408 awarded by the U.S. National Science Foundation. The government has certain rights in the invention.

BACKGROUND

Supersonic fluid flow is utilized in various applications including propulsion systems, aircraft, and others. As an example, fluid may flow into and out of jet engines at supersonic speeds. In another example, some aircraft are capable of achieving supersonic speeds such that the aircraft experiences supersonic fluid flow conditions along the exterior of the aircraft. Unlike subsonic flow, supersonic flow is characterized by the presence of discontinuities in the fluid properties (e.g., pressure, temperature, density) of the supersonic flow.

BRIEF SUMMARY OF THE DISCLOSURE

An embodiment of a supersonic flow system in which a supersonic flow is encountered comprises a surface configured to be exposed to a supersonic fluid flow, wherein the surface comprises an upstream end and a downstream end opposite the upstream end, a wave generator coupled to the surface and comprising one or more actuators configured to selectably induce strain in the surface, and a wave controller in signal communication with the wave generator and configured to activate the one or more actuators to induce one or more travelling waves configured to travel along the surface between the upstream end and the downstream end of the surface. In some embodiments, the wave generator comprises a plurality of the actuators and the wave controller is configured to activate each of the plurality of the actuators at the same frequency but out of phase with each other. In some embodiments, the wave controller is configured to alter one or more properties of the one or more travelling waves in response to a change in one or more properties of a supersonic fluid flow contacting the surface. In certain embodiments, the wave controller is configured to increase a frequency of activation of the one or more actuators of the wave generator in response to an increase in the speed of a supersonic fluid flow contacting the surface. In certain embodiments, the wave controller is configured to activate the one or more actuators to induce the one or more travelling waves such that the one or more induced travelling waves travel through the surface from the upstream end of the surface towards the downstream end of the surface. In some embodiments, the wave controller is configured to activate the one or more actuators to induce the one or more travelling waves such that the one or more induced travelling waves travel from the downstream end of the surface towards the upstream end of the surface. In some embodiments, the wave generator comprises a pair of the actuators and wherein the wave controller is configured to activate the pair of the actuators to induce the one or more travelling waves whereby the one or more travelling waves travel repeatedly through the surface from a first of the pair of the actuators to a second of the pair of the actuators. In certain embodiments, the one or more actuators comprises one or more piezoelectric actuators, wherein each piezoelectric actuator is coupled to the surface and configured to induce strain in the surface in response to receiving an activation signal from the wave controller. In certain embodiments, the one or more actuators comprises one or more linear actuators, wherein each linear actuator comprises an elongate member that is extendable and retractable with respect to the surface such that the elongate member is configured to apply an outwards strain to the surface in response to being extended and an inwards strain to the surface in response to being retracted. In some embodiments, the one or more actuators comprises a plurality of rolling elements positioned and moveable along a closed track, and wherein the wave controller is configured to induce the displacement of the plurality of rolling elements along the closed track to thereby induce the one or more travelling waves in the surface. In certain embodiments, the supersonic flow system comprises an airfoil wherein the surface comprises an outer surface of the airfoil and the wave generator is positioned along or within the airfoil, and wherein the wave controller is configured to induce the one or more travelling waves that travel through the surface from the upstream end and to the downstream end of the surface. In certain embodiments, the supersonic flow system comprises a jet engine, wherein the surface comprises a surface of the jet engine and the wave generator is positioned along or within the surface.

An embodiment of a method for conditioning a supersonic fluid flow comprises (a) exposing a surface to a supersonic fluid flow in contact with the surface, wherein the surface comprises an upstream end and a downstream end opposite the upstream end, and (b) inducing one or more travelling waves that travel along the surface between the upstream end and the downstream end of the surface and which interact with the supersonic fluid flow to alter one or more properties of the supersonic fluid flow. In some embodiments, (b) comprises (b1) activating by a wave controller one or more actuators of a wave generator in signal communication with the wave controller and coupled to the surface to thereby induce a strain in the surface. In some embodiments, (b) comprises (b1) activating by a wave controller a plurality of actuators of a wave generator in signal communication with the wave controller and coupled to the surface to thereby induce strain in the surface, and wherein the plurality of actuators are activated at the same frequency but out of phase from each other by the wave controller. In certain embodiments, (a) comprises (a1) inducing the supersonic fluid flow through a jet engine comprising the surface, and the one or more travelling waves travel through the surface from the downstream end of the surface towards the upstream end of the surface. In certain embodiments, (a) comprises (a1) inducing the supersonic fluid flow along an airfoil, the surface defining an external surface of the airfoil, and the one or more travelling waves travel through the surface from the upstream end of the surface towards the downstream end of the surface. In some embodiments, the method comprises (c) adjusting a property of the one or more travelling waves in response to a change in a fluid property of the supersonic fluid flow. In certain embodiments, (b) comprises (b1) activating by a wave controller a plurality of piezoelectric actuators of a wave generator in signal communication with the wave controller and coupled to the surface to thereby induce strain in the surface. In certain embodiments, (b) comprises (b1) activating by a wave controller a plurality of linear actuators of a wave generator in signal communication with the wave controller and coupled to the surface to thereby induce strain in the surface.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which:

FIG. 1 is a schematic view of an embodiment of a supersonic flow system in accordance with principles disclosed herein;

FIG. 2 is a schematic view of another embodiment of a supersonic flow system in accordance with principles disclosed herein;

FIG. 3 is a schematic view of another embodiment of a supersonic flow system in accordance with principles disclosed herein;

FIG. 4 is a schematic view of another embodiment of a supersonic flow system in accordance with principles disclosed herein;

DETAILED DESCRIPTION OF THE DISCLOSED EMBODIMENTS

Figure 5:
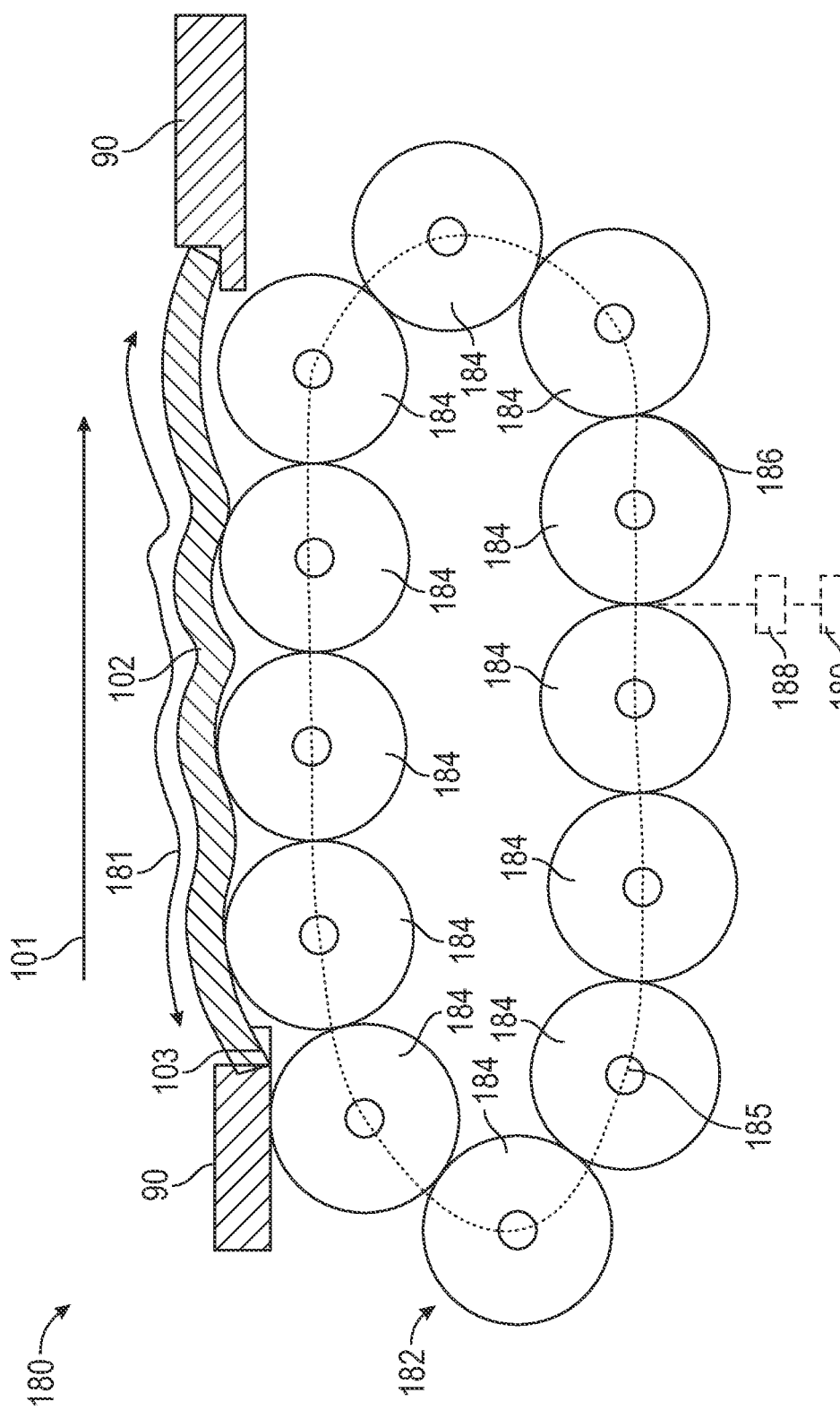
FIG. 5 is a schematic view of another embodiment of a supersonic flow system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Further, as used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, unlike subsonic flows, supersonic flows are characterized by the presence of discontinuity in the fluid properties of the supersonic flow. As used herein, the term "supersonic fluid flow" and "supersonic flow" are defined as referring to fluid flows at velocities having a Mach number exceeding one (1.0). Discontinuities may also be referred to as "shocks" in the supersonic flow that act upon the surfaces contacted by the fluid flow such as the fuselage of an aircraft travelling at supersonic speeds. The discontinuities or shocks endemic to supersonic flow may induce high stresses and strains in the materials that are exposed to and experience the shocks such as components of a jet engine producing a supersonic flow therethrough. These shocks may also increase the amount of fatigue incurred by the materials exposed to the shocks, potentially reducing the operational life of the components experiencing the shocks of the supersonic flow.

Current approaches to manage shocks induced by supersonic flow and associated stress, strain, and fatigue are to individually engineer each system to minimize the presence of such shocks in the supersonic flow or to use compliant structures in an attempt to damp out shocks present in the supersonic flow. However, such approaches often fail to sufficiently address these issues given that standing waves induced by such structures fail to adequately dampen said shocks.

Accordingly, embodiments described herein are directed to supersonic flow systems and methods that generate traveling waves through or along a surface to modify or tune one or more fluid properties or parameters of a supersonic fluid flow in contact with the surface. In some instances, supersonic flow systems described herein may generate travelling waves through the surface in order to mitigate and minimize the presence of shocks and other discontinuities in the supersonic fluid flow so as to, for example, minimize stresses imparted to the surface by the supersonic fluid flow. In other instances, supersonic flow systems described herein may generate travelling waves through the surface in order to accentuate and focus shocks at particular locations in the supersonic fluid flow so as to, for example, increase the efficiency and/or power outputted by an engine (e.g., a high-speed jet engine such as a scramjet) comprising the surface.

Embodiments of supersonic flow systems described herein generally include a surface that receives or encounters a supersonic fluid flow and a travelling wave generator coupled to the surface and configured to generate one or more travelling waves that travel through the surface either in the direction of the supersonic fluid flow (to minimize the presence of shocks or other discontinuities in the supersonic fluid flow) or in the opposite direction of the supersonic fluid flow (to accentuate and focus shocks in the supersonic fluid flow). The travelling wave generator may be powered (e.g., electrically powered) and configured to actively, rather than passively, generate travelling waves along the surface. Particularly, the travelling wave generator comprises one or more actuators for selectably imparting strain to the surface as controlled by a wave controller of the supersonic flow system whereby the strain imparted to the surface may induce one or more travelling waves in the surface.

Referring initially to FIG. 1, an embodiment of a supersonic flow system 10 is shown. In this exemplary embodiment, supersonic flow system 10 generally includes an airfoil 12 including a leading edge 14, a trailing edge 16 opposite the leading edge 14, an exterior vertically upper member or portion 13, and an exterior vertically lower member or portion 15 opposite the upper portion 13. Each portion 13 and 15 extends from the leading edge 14 to the trailing edge 16 of the airfoil 12. An inner cavity or interior 31 of the airfoil 12 is disposed between upper portion 13 and lower portion 15. Accordingly, upper portion 13 may be described as having an outer, upper surface 13a facing away from interior 31 and an inner, lower surface 13b facing interior 31; and lower portion 15 may be described as having an inner, upper surface facing 15a facing interior 31 and an outer, lower surface 15b facing away from interior 31. The outer, upper surface 13a of upper portion 13 defines the uppermost surface of the airfoil 12, and thus, upper surface 13a of upper portion 13 may also be referred to as the upper surface 13a of airfoil 12. In some embodiments, airfoil 12 defines a component (e.g., a wing) of an aircraft, such as a supersonic aircraft capable of supersonic speeds in a given direction of travel (indicated by arrow 19 in FIG. 1). Additionally, airfoil 12 is configured to generate aerodynamic lift in response to travelling through a fluid (e.g., air) at speed during operations. In this manner, airfoil 12 may generate lift sufficient to enable flight of the aircraft comprising the airfoil 12.

In this exemplary embodiment, supersonic flow system 10 also includes a travelling wave generator 30 located within interior 31 of the airfoil 12 and positioned proximal the upper portion 13 of airfoil 12. The supersonic flow system 10 further includes a generator power source 25 and a wave controller or control unit 30. While generator power source and wave controller 30 are each shown in FIG. 1 within the interior 31 of airfoil 12, it is to be understood that in other embodiments the generator power source 25 and/or wave controller 30 may be positioned external the airfoil 12, such as in another component of the aircraft comprising airfoil 12.

The travelling wave generator 30 extends (not necessarily continuously) from a first or upstream end 21 to a second or downstream end 23. In addition, in this embodiment, travelling wave generator 30 includes one or more actuators 22 that directly engage upper portion 13 of airfoil 12 so as to apply a strain to the outer, upper surface 13a of upper portion 13 as controlled by the wave controller 30. Particularly, in this exemplary embodiment, the actuators 22 of travelling wave generator 30 are configured, when controlled by the controller 30, to generate one or more travelling waves (schematically illustrated by arrow 27 in FIG. 1) that travel along traveling wave generator 30 in a direction that is generally parallel to the direction of a supersonic fluid flow (schematically illustrated by arrows 29 in FIG. 1) across the airfoil 12. It should be appreciated that since actuators 22 directly engage upper portion 13, the travelling waves 27 also move through and along upper surface 13a in a direction that is generally parallel to the direction of a supersonic fluid flow (schematically illustrated by arrows 29 in FIG. 1) across the airfoil 12. To state in other words, the travelling wave 27 travels along upper surface 13a in the direction of the supersonic fluid flow 29. Thus, the travelling wave 27 is defined by the changing or undulating shape of the upper surface 13a of airfoil 12 induced by the actuators 22 of travelling wave generator 30. It may be understood that the travelling wave 27 travels along the upper surface 13a in a direction generally toward trailing edge 16, and thus, does not comprise a standing wave positioned statically along the upper surface 13 of airfoil 12.

In general, travelling wave generator 30 may cyclically generate repeated travelling waves 27 across the upper surface 13a of airfoil 12. For instance, travelling wave generator may generate a first travelling wave 27 travelling along upper surface 13a generally from the upstream end 21 of travelling wave generator 30 to the downstream end 23 of travelling wave generator 30. The first travelling wave 27 along upper surface 13a of airfoil 12 may extinguish or cease upon reaching the downstream end 23. Either prior to, at the same time as, or following the cessation of the first travelling wave 27, travelling wave generator 30 may generate a similar, second travelling wave 27 that again travels along upper surface 13a generally from the upstream end 21 of travelling wave generator 30 to the downstream end 23 of travelling wave generator 30. This process may be repeated indefinitely or continuously as the airfoil 12 travels through the supersonic fluid flow 29.

The generator power source 25 is connected to the travelling wave generator 30 and is configured to supply the actuators 22 (and potentially other components of travelling wave generator 30) with power sufficient to establish one or more travelling waves 27 across the upper surface 13a of airfoil 12. Additionally, the wave controller 30 is in signal communication with the travelling wave generator 30 to control the operation of actuators 22 to thereby produce one or more travelling waves 27 across upper surface 13a of airfoil 12. Wave controller 30 may comprise a computer or computing system as will be discussed further herein.

It may be understood that the travelling waves 27 produced by travelling wave generator 30 interact with the supersonic fluid flow 29 so as to control or influence one or more parameters or fluid properties (e.g., pressure, temperature, density) of the supersonic fluid flow 29. Particularly, the travelling waves 27 may increase the streamwise velocity of the supersonic fluid flow 29 along the upper surface 13a of airfoil 12, reduce flow separation in the supersonic fluid flow 29 along the upper surface 13a, reduce shocks (e.g., the formation, presence, and/or magnitude of shock waves and/or other discontinuities) in the supersonic flow 29, and facilitate the minimization of turbulence (e.g., the formation, presence, and/or magnitude of fluctuations and eddies) in the supersonic fluid flow 29 along the upper surface 13a, thereby leading to more effective, stable performance of the airfoil 12 during operations. To state in other words, the travelling waves 27 assist in the removal of shock waves and/or in facilitating the reattachment of the supersonic fluid flow 29 along the upper surface 13a of airfoil 12. Additionally, the minimization of turbulence along the upper surface 13a of airfoil 12 provided by the generation of travelling waves 27 may also reduce the stresses and friction drag (drag) imparted to the airfoil 12 during operations by the supersonic fluid flow 29.

Referring now to FIG. 2, an embodiment of a supersonic flow system 50 is shown. In this exemplary embodiment, supersonic flow system 50 generally includes a jet engine in the form of a scramjet 52 having an inlet 55, an isolator 57 located downstream from the inlet 55, a combustor 59 located downstream from the isolator 57, and a nozzle 61 located downstream from the combustor 59. In this arrangement, the inlet 55 of scramjet 52 defines an upstream end of the scramjet 52 while the nozzle 61 defines a downstream end of the scramjet 52. A supersonic fluid flow 51 may enter the scramjet 52 at the inlet 55, accelerate within the scramjet 52, and exit from the nozzle 61 of the scramjet 52 as an exhaust fluid flow 53 having a greater velocity than the supersonic fluid flow 51.

As the supersonic fluid flow 51 enters the inlet 55 of scramjet 52, the supersonic fluid flow 51 forms a boundary layer 54 interacting with a contracting shock train 56 within the isolator 57 of the scramjet 52. In this exemplary embodiment, the isolator 57 and combustor 59 define a pair of opposed internal or inner surfaces 60 extending longitudinally along the isolator 57 and scramjet 52, where the shock train 56 is formed between the pair of opposing inner surfaces 60. It may be understood that in other embodiments the pair of opposed inner surfaces 60 may instead comprise, for example, a continuous cylindrical surface enveloping the shock train 56. The combustor 59 of the scramjet 52 includes one or more fuel injectors configured to inject fuel into the combustor 59 whereby the fuel may mix with the supersonic fluid flow 51 and ignite via one or more ignitors (not shown in FIG. 2) of the combustor 59 to further heat and accelerate the supersonic fluid flow 51 through the combustor 59.

In this exemplary embodiment, supersonic flow system 50 additionally includes one or more travelling wave generator 70 positioned along the inner surfaces 60 of the scramjet 52. One or more travelling wave generators 70 are also positioned along an external or outer surface 62 of the inlet 55 of scramjet 52. Each travelling wave generator 70 includes one or more actuators 72 configured to apply a strain to the inner surfaces 60 of scramjet 52 as controlled by a wave controller or control unit (not shown in FIG. 2) of the supersonic flow system 50. It may also be understood that the travelling wave generators may each be powered by a generator power source (not shown in FIG. 2). In some embodiments, the travelling wave generators 70 may be similar in configuration to the travelling wave generator 30 shown in FIG. 1; however, it may be understood that travelling wave generators 70 may also be configured differently in some embodiments from the travelling wave generator 30. Additionally, in this embodiment, travelling wave generators 70 are positioned along the inlet 55 and isolator 57 of scramjet 52; however, travelling wave generators 70 may be positioned at other locations along scramjet 52 in other embodiments.

Unlike the travelling wave generator 30 of FIG. 1, the travelling wave generators 70 shown in FIG. 2 are generally configured to generate one or more travelling waves (indicated by arrows 74 in FIG. 2) along the surfaces 60 and 62 of scramjet 52 in a direction opposed to the direction of supersonic fluid flow 51. To state in other words, the travelling waves 74 induced in surfaces 60 and 62 generally travel in a direction that is opposite the direction of the supersonic fluid flow 51 passing through scramjet 52. By travelling opposite the direction of the supersonic fluid flow 51, travelling waves 74, instead of minimizing shock waves and other discontinuities, generate and/or intensify discontinuities including shock waves in the supersonic fluid flow 51. In this manner, travelling waves 74 may be used to enhance the performance of the scramjet 52 by tuning or focusing shocks, thereby optimizing the shock train 56 developed within the scramjet 52 to enhance fluid properties (e.g., fluid compression) of the supersonic fluid flow 51.

Particularly, travelling waves 74 generated by the travelling wave generators 70 may focus the intensity of shock waves generated in the supersonic fluid flow 51 at desired locations within or along the scramjet 52 so as to boost the performance (e.g., the thermal efficiency and/or power outputted by the scramjet 52) of the scramjet 52. Supersonic flow system 50 thus illustrates how modifying the direction of the travelling waves with respect to the direction of the supersonic fluid flow may be utilized to perform different functions including minimizing turbulence and/or shocks within the supersonic fluid flow by having the travelling waves travel in the same direction of the supersonic fluid flow, and for enhancing or focusing turbulence and/or shocks in the supersonic fluid flow by having the travelling waves travel in the opposite direction of the supersonic fluid flow.

Referring now to FIG. 3, another embodiment of a supersonic flow system 100 is shown. In this exemplary embodiment, supersonic flow system 100 generally includes a wave surface 102, a pair of travelling wave generators 110, a generator power source 120, and a wave controller 130. Wave surface 102 extends between a first or upstream end 103 and a second or downstream end 105 where a supersonic fluid flow 101 contacts and flows along the wave surface 102. Thus, the supersonic fluid flow 101 flows longitudinally along the wave surface 102 between the upstream and downstream ends 103 and 105 thereof. The upstream and downstream ends 103 and 105 of wavy surface 102 are coupled or affixed to a support structure 90 configured to limit or inhibit the deflection of ends 103 and 105 of wave surface 102 with respect to the support structure 90. In this configuration, wavy surface 102 is allowed to vibrate or undulate with respect to the support structure 90 whereby one or more travelling waves 109 may be induced in the wavy structure by the travelling wave generators 110 as described further herein. In general, the travelling waves 109 may travel in a direction the same as or opposite of the direction of supersonic fluid flow 101.

In this exemplary embodiment, each travelling wave generator 110 comprises one or more piezoelectric actuators, and thus, may also be referred to herein as a piezoelectric actuator 110. However, the configuration of travelling wave generators 110 may vary in other embodiments. As an example, in other embodiments, travelling wave generators 110 may comprise actuators formed from a shape memory alloy (SMA) configured to change shapes in response to receiving a signal such as an electrical signal. It should also be understood that in some embodiments the actuators 22 shown in FIG. 1 and/or the actuators 72 shown in FIG. 2 may comprise piezoelectric actuators (e.g., piezoelectric actuators 110 shown in FIG. 3). In this exemplary embodiment, a first of the pair of piezoelectric actuators 110 is positioned proximal the upstream end 103 of wave surface 102 while a second of the pair of piezoelectric actuators 110 is positioned proximal the downstream end 105 of wave surface 102.

Piezoelectric actuators 110 directly engage the structure including wave surface 102, and thus, upon activation by the wave controller 130, piezoelectric actuators 110 induce a controlled and repeatable strain in the wave surface 102 at a desired longitudinal location therealong to generate the travelling waves 109. For example, in response to receiving an activation signal from the wave controller 130, the pair of piezoelectric actuators 110 may each contract or expand in length to thereby induce a corresponding strain in the wave surface 102 at the locations along wave surface 102 proximal the piezoelectric actuators 110.

Power source 120 is connected to the pair of piezoelectric actuators 110 and may power the piezoelectric actuators 110 as controlled by the wave controller 130. It may be understood that power source 120 may comprise various types of power sources including electrical power sources (e.g., batteries) as well as other types of known power sources. Wave controller 130 is connected to the power source 120 and/or piezoelectric actuators 110. Additionally, wave controller 130 may comprise a computer or computing system as will be discussed further herein.

In this exemplary embodiment, piezoelectric actuators 110 may be activated by the wave controller 130 at the same frequency but out of phase with each other such that a first piezoelectric actuator 110 is activated by wave controller 130 followed by the activation of a second piezoelectric actuator 110 by the wave controller 130 and so on and so forth. The difference in phase between the activation of piezoelectric actuators 110 may be controlled by the wave controller 130 to thereby control the direction of the travelling waves 109 induced in the wave surface 102 by actuators 110. Thus, wave controller 130 may alter the direction (e.g., vary between travelling with versus travelling against the direction of supersonic fluid flow 101) during operation of the supersonic flow system 100. Additionally, the wave controller 130 may control or adjust the frequency of activation of piezoelectric actuators 110 based on changes to fluid properties of the supersonic fluid flow 101. As one example, wave controller 130 may decrease the activation frequency of piezoelectric actuators 110 in response to a decline in velocity of the supersonic fluid flow 101.

Referring now to FIG. 4, another embodiment of a supersonic flow system 150 is shown. In this exemplary embodiment, supersonic flow system 150 generally includes wave surface 102, a plurality of travelling wave generators 152, a generator power source 160, and a wave controller 165. Travelling wave generators 152 are spaced longitudinally along the structure defining the wave surface 102 between the upstream and downstream ends 103 and 105 thereof. Additionally, each of the plurality of travelling wave generators 152 comprises, in this exemplary embodiment, a linear actuator, and thus, may also be referred to herein as a linear actuator 152. Each linear actuator 152 comprises an elongate member such as a rod or piston 154 that extends and retracts in a direction generally orthogonal to a longitudinal axis of the wave surface 102 such that that a terminal end of each elongate member 154 contacts the structure defining the wave surface 102 at different longitudinal positions. In this manner, the extension and retraction of linear actuators 152 may be controlled by the wave controller 165 to induce one or more travelling waves 151 along the wave surface 102 that move therealong in the same direction as, or opposite of, the direction of the supersonic fluid flow 101 contacting the wave surface 102.

The extension and retraction of the elongate members 154 of linear actuators 152 are powered by the power source 160 as controlled by the wave controller 165. In some embodiments, power source 160 and wave controller 165 are configured similarly as the power source 120 and wave controller 130 shown in FIG. 3 and previously described. In this exemplary embodiment, wave controller 165 may repeatedly induce the formation of travelling waves 151 in the wave surface 102 in response to selectably extending and retracting the elongate members 154 of linear actuators 152. In some embodiments, wave controller 165 activates (e.g., extends or retracts elongate members 154) at the same frequency but out of phase with each other such that, for example, a first linear actuator 152 located proximal the upstream end 103 of wave actuator 102 may begin to extend prior to the remaining linear actuators 152, followed by a second linear actuator 152 located adjacent to the first linear actuator 152, and so on and so forth. In this manner, the travelling waves 151 formed by linear actuators 152 travel longitudinally along wave surface 102 from the upstream end 103 to the downstream end 105 and/or from the downstream end 105 to the upstream end 103.

Referring now to FIG. 5, another embodiment of a supersonic flow system 180 is shown. In this exemplary embodiment, supersonic flow system 180 generally includes wave surface 102 as previously described, a travelling wave generator 182, a generator power source 188, and a wave controller 189. The generator power source 188 and wave controller 189 may be configured similarly as the generator power sources (e.g., power sources 25, 120, 160, and 188) and wave controllers (e.g., wave controllers 30, 130, 165, and 189) described above, and thus will not be described in detail herein.

The travelling wave generator 182 is configured to, as controlled by the wave controller 189, generate one or more travelling waves 181 that travel along the wave surface 102 longitudinally between the upstream end 103 and the downstream end 105 thereof. In this exemplary embodiment, travelling wave generator 182 generally includes a plurality of rolling elements or rollers 184 arranged along a closed or endless flexible member 186 (e.g., an endless chain or track) positioned adjacent the wave surface 102. In this configuration, rollers 184 travel along an enclosed circuit (indicated by arrow 185 in FIG. 5) defined by the flexible member 186. As the rollers 184 travel along the closed circuit 185, the rollers 184 repeatedly contact and roll along a side of the structure defining the wave surface 102 that is opposite the wave surface 102, thereby generating one or more travelling waves 182 along the wave surface 102.

As with the embodiments of supersonic flow systems described above, the wave controller 189 of supersonic flow system 180 may control or adjust the frequency of activation of travelling wave generator 182 based on, or in response to, changes to fluid properties of the supersonic fluid flow 101. As one example, wave controller 189 may decrease the speed at which rollers 184 travel along closed circuit 185 in response to a decline in velocity of the supersonic fluid flow 101. Conversely, wave controller 189 may increase the speed at which rollers 184 travel along closed circuit 185 in response to a increase in velocity of the supersonic fluid flow 101. As another example, wave controller 189 may adjust the amplitude of the travelling waves 181 produced in wave surface 102 by adjusting a position of the endless chain 186 relative to the position of the wave surface 102. For instance, the endless chain 186 may be shifted towards the wave surface 102 in order to increase the amplitude of travelling waves 181. Conversely, the endless chain 186 may be shifted away from the wave surface 102 in order to decrease the amplitude of travelling waves 181.

Figure 6:
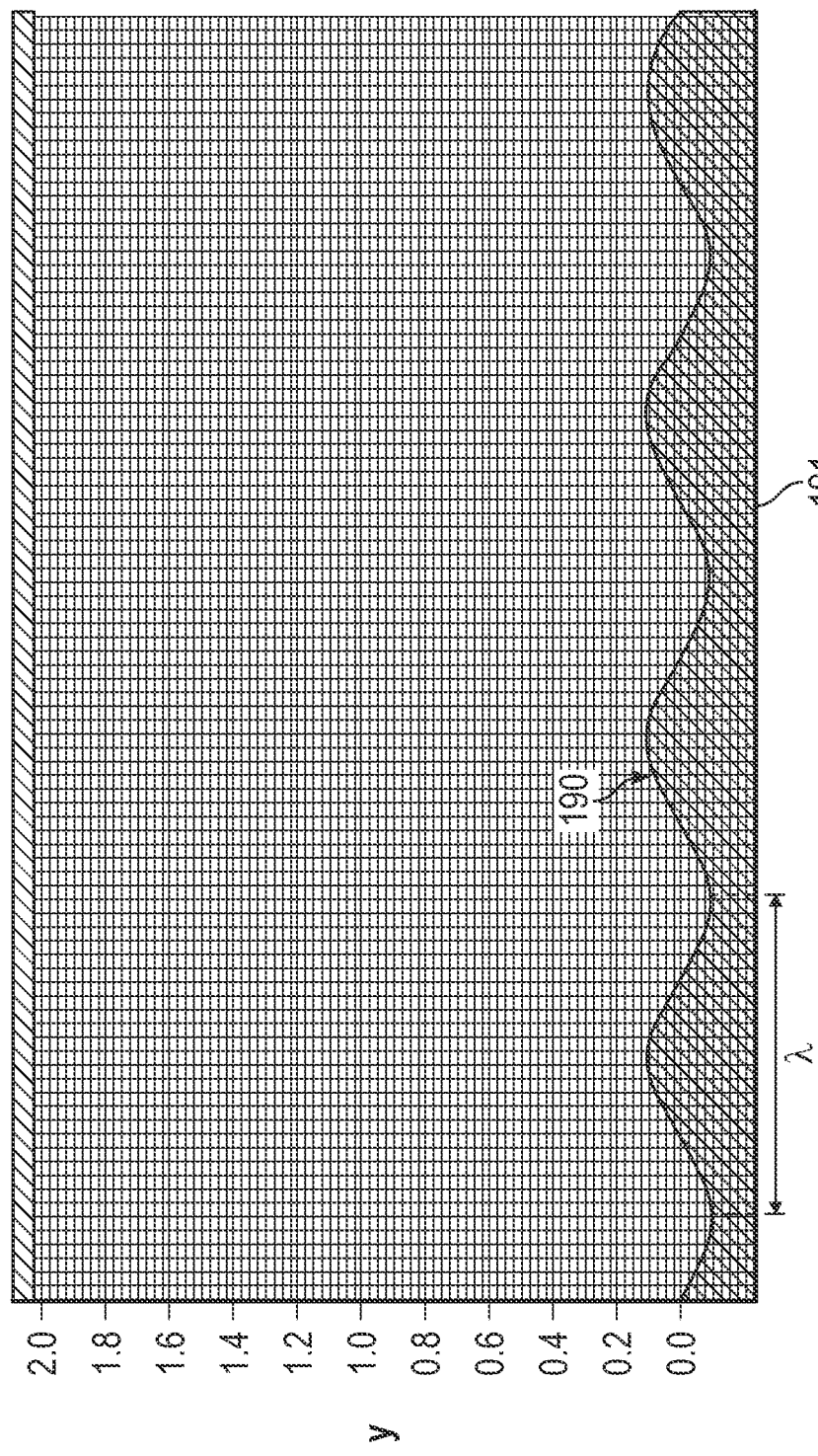
FIG. 6 is a side view of a simulated wavy surface contained in a channel.
Figure 7:
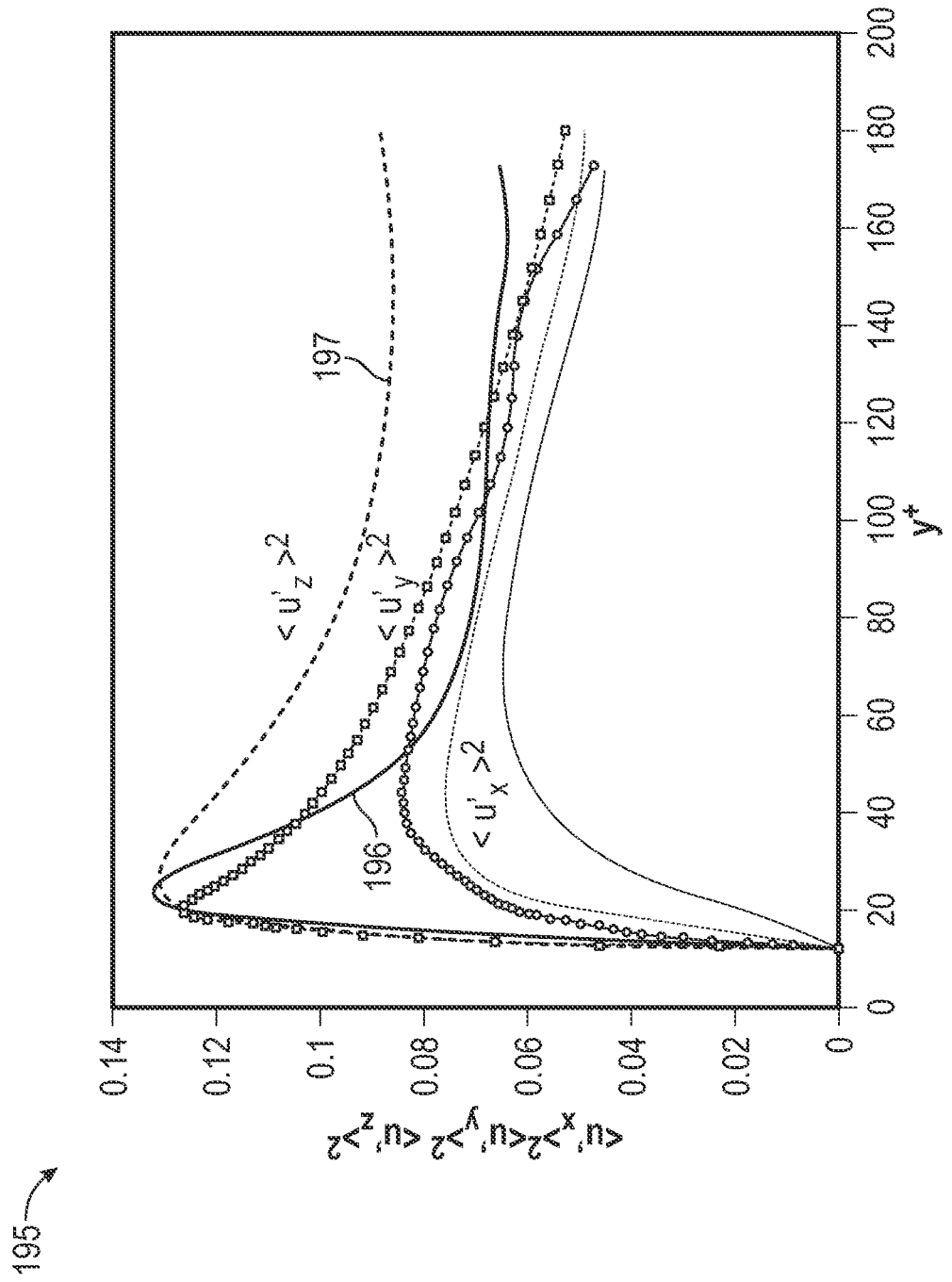
FIG. 7 is a graph illustrating turbulence statistics for different waves produced along the simulated wavy surface of FIG. 6.

Referring now to FIGS. 6 and 7, a simulated surface 190 formed in a channel 191 and along which waves of varying configuration nay be formed is shown in FIG. 6. Additionally, FIG. 7 illustrates a graph 195 comparing turbulence of supersonic flows producible along the simulated wavy surface 190 of FIG. 6. Particularly, while simulated wavy surface 190 extends three-dimensionally, FIG. 6 illustrates simulated wavy surface 190 from a side perspective such that the simulated wavy surface 190 extends in the Z-direction and Y-direction in FIG. 6.

Graph 190 illustrates turbulent statistics, and particularly, velocity fluctuations in (x), (y), and (z) directions, (i.e., $u_x'$, $u_y'$ and $u_z'$ directions, where < > denotes averaging) at the peak of a different waves as function of non-dimensional wall distance ($y^+$) from the simulated wavy surface 190. It may be observed that a traveling wave 196 illustrated in graph 195 generally reduces the turbulence relative to a stationary wave surface 197 in a simulated flow through the channel 191. In this example, the supersonic flow Mach number is 1.5 and the Reynolds number is 3000 based on the channel half width. Additionally, it may be understood that the wavy surface 190 (stationary or traveling) was at the bottom surface (y=0) of the channel 191. In this example, the amplitude of the wavy surface 190 is 0.07 of the channel half width H and the wavelength of the wave was $$\frac{\pi}{2}$$

of the channel half width . . . .

Figure 8:
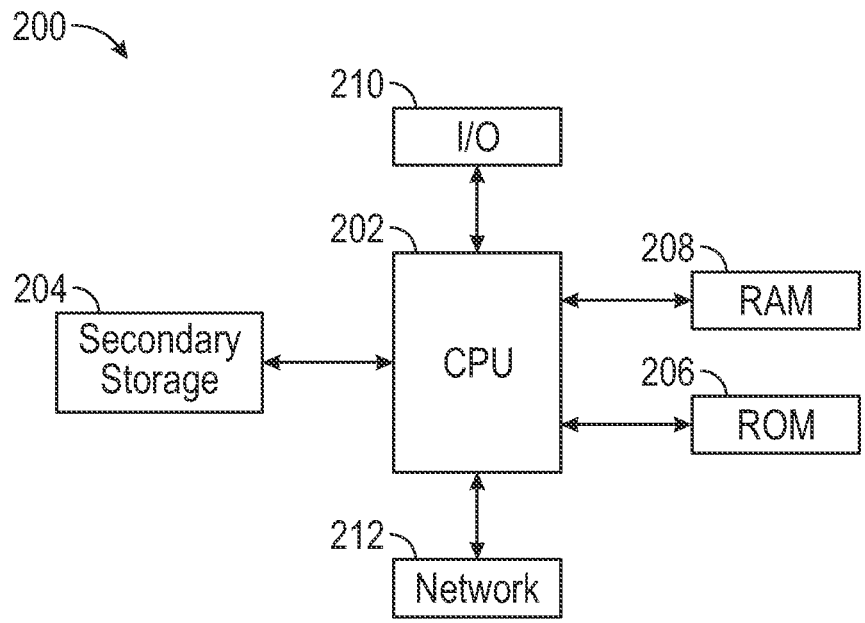
FIG. 8 is a block diagram of an embodiment of a computer system in accordance with principles disclosed herein.

As an example, and referring to FIG. 8, an embodiment of a computer system 200 is shown suitable for implementing one or more components (e.g., wave controllers 30, 130, and 189) disclosed herein. The computer system 200 of FIG. 8 includes a processor 202 (which may be referred to as a central processor unit or CPU) that is in communication with memory devices including secondary storage 204, read only memory (ROM) 206, random access memory (RAM) 208, input/output (I/O) devices 210, and network connectivity devices 212. The processor 202 may be implemented as one or more CPU chips. It is understood that by programming and/or loading executable instructions onto the computer system 200, at least one of the CPU 202, the RAM 208, and the ROM 206 are changed, transforming the computer system 200 in part into a particular machine or apparatus having the novel functionality taught by the present disclosure.

Additionally, after the system 200 is turned on or booted, the CPU 202 may execute a computer program or application. For example, the CPU 202 may execute software or firmware stored in the ROM 206 or stored in the RAM 208. In some cases, on boot and/or when the application is initiated, the CPU 202 may copy the application or portions of the application from the secondary storage 204 to the RAM 208 or to memory space within the CPU 202 itself, and the CPU 202 may then execute instructions that the application is comprised of. In some cases, the CPU 202 may copy the application or portions of the application from memory accessed via the network connectivity devices 212 or via the I/O devices 210 to the RAM 208 or to memory space within the CPU 202, and the CPU 202 may then execute instructions that the application is comprised of. During execution, an application may load instructions into the CPU 202, for example load some of the instructions of the application into a cache of the CPU 202. In some contexts, an application that is executed may be said to configure the CPU 202 to do something, e.g., to configure the CPU 202 to perform the function or functions promoted by the subject application. When the CPU 202 is configured in this way by the application, the CPU 202 becomes a specific purpose computer or a specific purpose machine.

Secondary storage 204 may be used to store programs which are loaded into RAM 208 when such programs are selected for execution. The ROM 206 is used to store instructions and perhaps data which are read during program execution. ROM 206 is a non-volatile memory device which typically has a small memory capacity relative to the larger memory capacity of secondary storage 204. The secondary storage 204, the RAM 208, and/or the ROM 206 may be referred to in some contexts as computer readable storage media and/or non-transitory computer readable media. I/O devices 210 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 212 may take the form of modems, modem banks, Ethernet cards, universal serial bus (USB) interface cards, wireless local area network (WLAN) cards, radio transceiver cards, and/or other well-known network devices. The network connectivity devices 212 may provide wired communication links and/or wireless communication links. These network connectivity devices 212 may enable the processor 202 to communicate with the Internet or one or more intranets. With such a network connection, it is contemplated that the processor 202 might receive information from the network, or might output information to the network. Such information, which may include data or instructions to be executed using processor 202 for example, may be received from and outputted to the network, for example, in the form of a computer data baseband signal or signal embodied in a carrier wave.

The processor 202 executes instructions, codes, computer programs, scripts which it accesses from hard disk, floppy disk, optical disk, flash drive, ROM 206, RAM 208, or the network connectivity devices 212. While only one processor 202 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 204, for example, hard drives, floppy disks, optical disks, and/or other device, the ROM 206, and/or the RAM 208 may be referred to in some contexts as non-transitory instructions and/or non-transitory information.

In an embodiment, the computer system 200 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, the functionality disclosed above may be provided by executing the application and/or applications in a cloud computing environment. Cloud computing may comprise providing computing services via a network connection using dynamically scalable computing resources.

Figure 9:
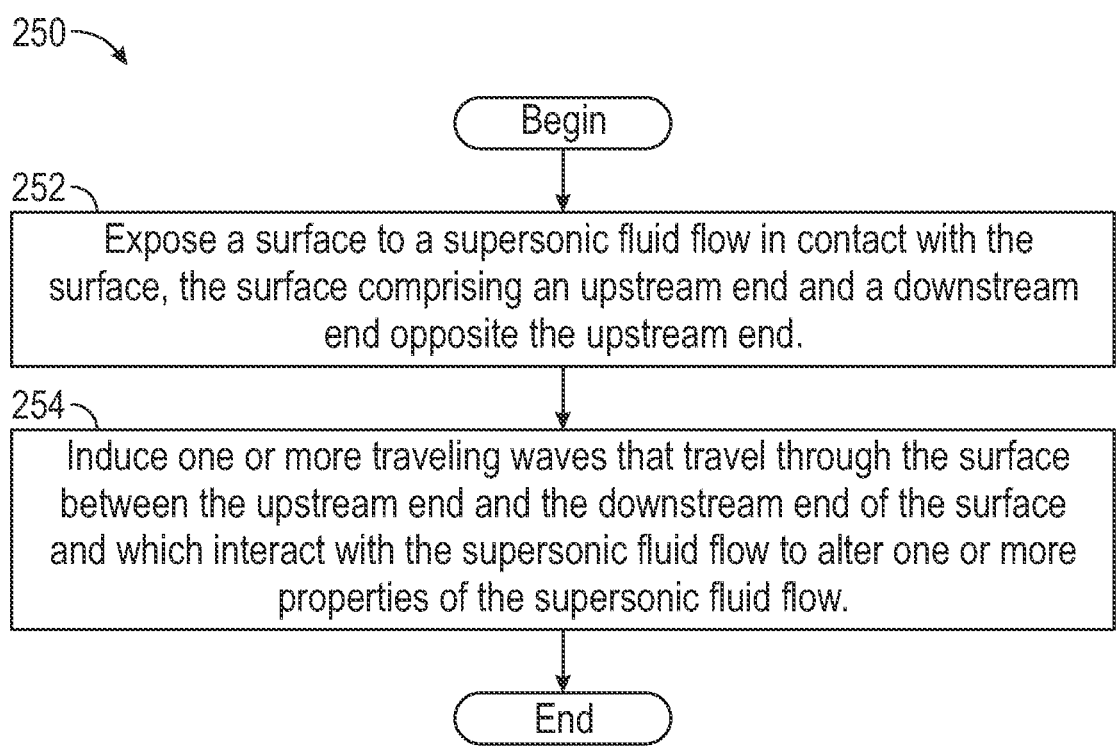
FIG. 9 is a flowchart of an embodiment of a method for conditioning a supersonic fluid flow in accordance with principles disclosed herein.

Referring now to FIG. 9, an embodiment of a method 250 for conditioning a supersonic fluid flow is shown. Initially, method 250 comprises at block 252 exposing and contacting a surface to a supersonic fluid flow, the surface comprising an upstream end and a downstream end opposite the upstream end. In some embodiments, block 252 comprises exposing the surface 102 shown in FIGS. 3-5 to a supersonic fluid flow (e.g., supersonic fluid flow 101 shown in FIGS. 3-5) in contact with the surface 102. At block 254, method 250 comprises inducing one or more travelling waves that travel through the surface between the upstream end and the downstream end of the surface. The travelling waves interacting with the supersonic fluid flow to alter one or more properties of the supersonic fluid flow. In some embodiments, block 254 comprises inducing one or more travelling waves (e.g., travelling waves 27, 74, 109, 151, and 181 described above) that interact with the supersonic fluid flow to alter one or more properties of the supersonic fluid flow such as, for example, pressure, pressure gradient, velocity, velocity fluctuations, which may in turn alter the density and temperature of the supersonic fluid flow.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A supersonic flow system in which a supersonic flow is encountered, the system comprising:
   a surface configured to be exposed to a supersonic fluid flow, wherein the surface comprises an upstream end and a downstream end opposite the upstream end;
   a wave generator coupled to the surface and comprising one or more actuators configured to selectably induce strain in the surface; and
   a wave controller in signal communication with the wave generator the wave controller comprising a processor and a memory device including instructions that when executed by the processor, cause the wave controller to:
   activate the one or more actuators to induce one or more travelling waves configured to travel along the surface between the upstream end and the downstream end of the surface; and
   control the activation of the one or more actuators to alter one or more properties of the supersonic flow whereby one or more shocks in the supersonic flow are selectably adjusted using the one or more travelling waves.

2. The supersonic flow system of claim 1, wherein the wave generator comprises a plurality of the actuators and the wave controller is configured to activate each of the plurality of the actuators at the same frequency but out of phase with each other.

3. The supersonic flow system of claim 1, wherein the wave controller is configured to alter one or more properties of the one or more travelling waves in response to a change in one or more properties of a supersonic fluid flow contacting the surface.

4. The supersonic flow system of claim 1, wherein the wave controller is configured to increase a frequency of activation of the one or more actuators of the wave generator in response to an increase in the speed of a supersonic fluid flow contacting the surface.

5. The supersonic flow system of claim 1, wherein the wave controller is configured to activate the one or more actuators to induce the one or more travelling waves such that the one or more induced travelling waves travel through the surface from the upstream end of the surface towards the downstream end of the surface.

6. The supersonic flow system of claim 1, wherein the wave controller is configured to activate the one or more actuators to induce the one or more travelling waves such that the one or more induced travelling waves travel from the downstream end of the surface towards the upstream end of the surface.

7. The supersonic flow system of claim 1, wherein the wave generator comprises a pair of the actuators and wherein the wave controller is configured to activate the pair of the actuators to induce the one or more travelling waves whereby the one or more travelling waves travel repeatedly through the surface from a first of the pair of the actuators to a second of the pair of the actuators.

8. The supersonic flow system of claim 1, wherein the one or more actuators comprises one or more piezoelectric actuators, wherein each piezoelectric actuator is coupled to the surface and configured to induce strain in the surface in response to receiving an activation signal from the wave controller.

9. The supersonic flow system of claim 1, wherein the one or more actuators comprises one or more linear actuators, wherein each linear actuator comprises an elongate member that is extendable and retractable with respect to the surface such that the elongate member is configured to apply an outwards strain to the surface in response to being extended and an inwards strain to the surface in response to being retracted.

10. The supersonic flow system of claim 1, wherein the one or more actuators comprises a plurality of rolling elements positioned and moveable along a closed track, and wherein the wave controller is configured to induce the displacement of the plurality of rolling elements along the closed track to thereby induce the one or more travelling waves in the surface.

11. The supersonic flow system of claim 1, further comprising an airfoil wherein the surface comprises an outer surface of the airfoil and the wave generator is positioned along or within the airfoil, and wherein the wave controller is configured to induce the one or more travelling waves that travel through the surface from the upstream end and to the downstream end of the surface.

12. The supersonic flow system of claim 1, further comprising a jet engine, wherein the surface comprises a surface of the jet engine and the wave generator is positioned along or within the surface.

13. The supersonic flow system of claim 1, wherein the instructions, when executed by the processor, cause the wave controller to control the activation of the one or more actuators to reduce a flow separation between the supersonic flow and the surface using the one or more travelling waves.

14. The supersonic flow system of claim 1, wherein the instructions, when executed by the processor, cause the wave controller to control the activation of the one or more actuators to increase a streamwise velocity of the supersonic fluid flow along the surface using the one or more travelling waves.

15. A supersonic flow system in which a supersonic flow is encountered, the system comprising:
- a surface configured to be exposed to a supersonic fluid flow, wherein the surface comprises an upstream end and a downstream end opposite the upstream end;
- a wave generator coupled to the surface and comprising one or more actuators configured to selectably induce strain in the surface; and
- a wave controller in signal communication with the wave generator, the wave controller comprising a processor and a memory device including instructions that, when executed by the processor, cause the wave controller to:
  - activate the one or more actuators to induce one or more travelling waves configured to travel along the surface between the upstream end and the downstream end of the surface; and
  - control the activation of the one or more actuators to at least one of reduce a flow separation between the supersonic flow and the surface using the one or more travelling waves, and increase a streamwise velocity of the supersonic fluid flow along the surface using the one or more travelling waves whereby one or more shocks in the supersonic fluid flow are selectably adjusted.

16. The supersonic flow system of claim 15, wherein the instructions, when executed by the processor, cause the wave controller to adjust a frequency of the activation of the one or more actuators to at least one of reduce the flow separation between the supersonic flow and the surface using the one or more travelling waves, and increase the streamwise velocity of the supersonic fluid flow along the surface using the one or more travelling waves whereby the one or more shocks in the supersonic fluid flow are selectably adjusted.

17. A supersonic flow system in which a supersonic flow is encountered, the system comprising:
- a surface configured to be exposed to a supersonic fluid flow, wherein the surface comprises an upstream end and a downstream end opposite the upstream end;
- a wave generator coupled to the surface and comprising one or more actuators configured to selectably induce strain in the surface; and
- a wave controller in signal communication with the wave generator, the wave controller comprising a processor and a memory device including instructions that, when executed by the processor, cause the wave controller to:
  - activate the one or more actuators to induce one or more travelling waves configured to travel along the surface between the upstream end and the downstream end of the surface; and
  - adjust a frequency of the activation of the one or more actuators to at least one of increase a speed of the one or more travelling waves in response to an increase in the speed of the supersonic flow, and decrease the speed of the one or more travelling waves in response to a decrease in the speed of supersonic flow whereby one or more shocks in the supersonic fluid flow are selectably adjusted.

18. The supersonic flow system of claim 17, wherein the instructions, when executed by the processor, cause the wave controller to adjust a frequency of the activation of the one or more actuators to at least one of increase a speed of the one or more travelling waves in response to an increase in the speed of the supersonic flow, and decrease the speed of the one or more travelling waves in response to a decrease in the speed of supersonic flow whereby a flow separation between the supersonic flow and the surface using the one or more travelling waves is reduced.

* * * * *